2,988,540
POLYSULFIDES OF 6-SUBSTITUTED 2,2,4-TRI-METHYL-1,2-DIHYDROQUINOLINE AND THEIR USE IN RUBBER

Richard W. Kibler, Cuyahoga Falls, Ohio, assignor to The Firestone Tire & Rubber Company, Akron, Ohio, a corporation of Ohio
No Drawing. Filed June 16, 1959, Ser. No. 820,585
14 Claims. (Cl. 260—79.5)

This invention relates to curing agents for sulfur-vulcanizable rubber-like materials and, more particularly, to improved polysulfide type curing agents, the method of preparing them, curing processes in which these improved curing agents are employed, and the cured rubber products.

As the art of vulcanization of rubber-like materials has progressed, agents which effect more rapid curing, either by themselves or in conjunction with elemental sulfur or other curing agent, have been developed for use in mass production techniques. For instance, certain mercaptans, organic sulfides, substituted guanidines and aldehyde-amine condensates are well known for their ability to greatly accelerate the vulcanizing action of elemental sulfur. Similarly, such compounds as tetramethylthiuram mono- and di- sulfides, certain metal dithiocarbamates, and various amines and amine salts have been found effective as secondary accelerators or activators. Many of these commonly employed materials, however, have been found undesirable, inter alia, because of their tendency to promote scorching during the milling.

This invention relates to new polysulfides and their use in the vulcanization of sulfur-vulcanizable diene rubber, whether the rubber be natural rubber or a synthetic rubber or a mixture thereof. The synthetic rubbers to which the invention is applicale are the homopolymers of conjugated dienes (e.g. polyisoprene, polybutadiene, isoprene-butadiene copoplymer, etc.) and copolymers of conjugated dienes (e.g. isoprene, butadiene, etc.) and ethylenically unsaturated monomers (e.g. styrene, substituted styrenes, acrylonitrile, methacrylonitrile, methyl and other alkyl acrylates, methyl and other alkyl methacrylates, vinyl pyridine, vinylidene cyanide, etc.) and include, for example, SRB, NBR, CR, IR, BR, ABR, IIR, PBR and SIR.

The new polysulfides produce improved cured (or vulcanized) rubber products which have excellent properties. They are polysulfides of 2,2,4-trimethyl-1,2-dihydroquinoline and 6-substituted-2,2,4-trimethyl-1,2-dihydroquinolines in which the 6-substituent is an alkyl group of 1 to 20 carbon atoms; a cycloalkyl group of 5 to 8 carbon atoms; an aryl group including any hydrocarbon-substituted aryl group of 6 to 20 carbon atoms; an alkoxy group of 1 to 20 carbon atoms; an aryloxy group of 6 to 20 carbon atoms including such groups with one or more alkyl substituents; a dialkylamino group of 2 to 10 carbon atoms; an arylamino group of 6 to 12 carbon atoms; or an aralkyl group with 1 to 3 carbon atoms in the alkyl substituent. Compounds containing any of the following 6-substituents (or isomers thereof) are representative of the substituted compounds of this invention:

methyl
ethyl
pentyl
octyl
decyl
heptadecyl
octadecyl
eicosyl
ethoxy
t-butyl
nonylphenyl
decylphenyl
methylethylphenyl
naphthyl
methylnaphthyl
decylnaphthyl
anthracyl
phenanthryl
phenoxy
cresyloxy
t-amyl
isopropyl
cyclohexyl
cyclopentyl
1-methylcyclohexyl
1-methylcyclopentyl
4-ethylcyclohexyl
1-ethylcyclopentyl
methoxy
propoxy
butoxy
dodecyloxy
nondecyloxy
phenyl
tolyl
xylyl
ethylphenyl
propylphenyl
butylphenyl
tolyloxy
naphthyloxy
methylnaphthyloxy
decylnaphthyloxy
benzyl
alpha-methylbenzyl
alpha,alpha-dimethylbenzyl
beta-phenylethyl
dimethylamino
diethylamino
methylethylamino
dipropylamino
dibutylamino
diamylamino
phenylamino
tolylamino
xylamino
naphthylamino
biphenylamino These unsubstituted and 6-substituted-2,2,4-trimethyl-1,2-di-hydroroquinolines will be referred to herein as TDHQs.

The invention includes the new polysulfides, their preparation, their use in the vulcanization of rubber, and the resulting rubber products. The sulfur bridges may contain two, three or four sulfur atoms.

The polysulfides of the TDHQs are valuable rubber compounding ingredients, because the over-all amount of sulfur required for curing in their presence is less than if the TDHQs were used with free sulfur. The use of the polysulfides is preferred because the rubbers cured in this way are less subject to cracking.

The polysulfides are preferably produced by reaction of a TDHQ with sulfur monosulfide ($S_2Cl_2$), preferably in the presence of sulfur, in a suitable solvent, such as the hydrocarbon and chlorinated hydrocarbon solvents, e.g., benzene, toluene, a xylene, heptane, pentane, hexane, petroleum ether, chloroform, carbon tetrachloride, trichloroethylene, and mixtures comprising any of the foregoing. An alkali is used to remove and neutralize the HCl produced. Suitable alkalis include alkali metal and alkaline earth metal hydroxides, carbonates, borates and phosphates and ammonia, strong amines. A mixture of TDHQs can be used. The added sulfur gives polysulfides containing more than two sulfur atoms per molecule. The reaction can be carried out at room temperature, but is preferably carried out at an elevated temperature between 30° C. and 50° C. If two mols of TDHQ are reacted with one mol of sulfur monochloride (with or without added sulfur) the sulfur links the nitrogens in the quinoline molecules to form the following compound:

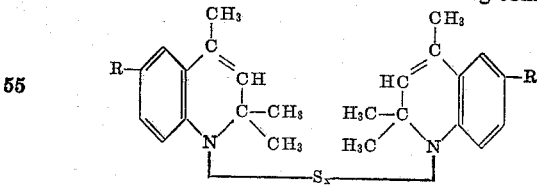

in which $x$ is at least 2, and preferably 3 or 4, and R is hydrogen or an alkyl group of 1 to 20 carbon atoms; a cycloalkyl group of 5 to 8 carbon atoms; an aryl group including any hydrocarbon-substituted aryl group of 6 to 20 carbon atoms; an alkoxy group of 1 to 20 carbon atoms; an aryloxy group of 6 to 20 carbon atoms including such groups with one or more alkyl substituents; a dialkylamino group of 2 to 10 carbon atoms; an arylamino group of 6 to 12 carbon atoms; or an aralkyl group with 1 to 3 carbon atoms in the alkyl substituent. Excess $S_xCl_2$ probably forms carbon-sulfur-carbon and possibly carbon-sulfur-nitrogen linkages between atoms of the same or different polysulfide molecules. The reaction product contains at least 15% sulfur and may contain as much as 30% or more. Both substituents in a compound may be the same or different.

In order to produce these polysulfides it is desirable to use 1 to 2 mols of TDHQ to 1 mol (with preferably a slight excess) of $S_xCl_2$. Even using this ratio of reactants some polysulfide linkage probably occurs between a carbon or nitrogen of one substituted quinoline molecule with a carbon of the same or another quinoline molecule. The number of such linkages is increased by using an insufficient amount of TDHQ to produce a product of the foregoing formula.

The TDHQs are preferably prepared by starting with benzene or the appropriate substituted benzene, i.e. benzene in which the intended 6-substituent is substituted in the benzene ring. This is nitrated and the resulting paranitro-compound is reduced to the corresponding aromatic amine which is reacted with acetone, following the known procedure for the preparation of known unsubstituted and 6-substituted-2,2,4-trimethyl-1,2-dihydroquinolines.

The following examples illustrate the invention.

EXAMPLE I 2,2,4 - trimethyl - 1,2 - dihydro - 6 - ethoxy - dihydroquinoline (173.6 g.) (0.8 mol) was dissolved in 1200 ml. of benzene and the solution was placed in a 3 liter, 3 neck flask. A solution of sodium hydroxide (64 g.) (1.6 mol) in 600 ml. water was then added to the flask. The benzene layer was stirred and a solution of sulfur (25.6 g.) (0.8 atom) in $S_2Cl_2$ (108 g.) (0.8 mol) which was previously heated to 120° C. and cooled, was added dropwise with stirring. Heat was liberated and a high temperature of 50° C. was reached without cooling the reaction mixture. The reaction mixture was stirred for 1 hour after the $S_2Cl_2$, sulfur addition. The benzene layer was separated, washed 3 times with water, and dried over calcium chloride. The benzene was then removed by distilling under reduced pressure until the final stripping conditions of 140°/35 mm. were reached and held for one hour. The product was a viscous liquid which changed to a brittle solid on cooling. The sulfur content was found to be 29.48%. This is equivalent to 3 atoms of sulfur combined with 1 mol of 6-ethoxy-2,2,4-trimethyl-1,2-dihydroquinoline.

EXAMPLE II 6-phenyl-2,2,4-trimethyl-1,2-dihydroquinoline (200 g.) (0.8 mol) was dissolved in 1800 ml. of benzene and the solution was placed in a 3-liter, 3-neck flask. A solution of sodium hydroxide (64 g.) (1.6 mol) in 600 ml. water was then added to the flask. The benzene layer was stirred and a solution of sulfur (25.6 g.) (0.8 atom) in $S_2Cl_2$ (108 g.) (0.8 mol) which was previously heated to 120° C. and cooled was added dropwise with stirring. Heat was liberated and a high temperature of 50° C. was reached without cooling the reaction mixture. The reaction mixture was stirred for 1 hour after the $S_2Cl_2$, sulfur addition. The benzene layer was separated, washed 3 times with water and dried over calcium chloride. The benzene was then removed by distilling under reduced pressure until the final stripping conditions of 140°/35 mm. were reached and held for one hour. The product was a viscous liquid that changed to a brittle solid on cooling. The sulfur content was found to be 26.73%. This is equivalent to 3 atoms of sulfur combined with one mol of 6-phenyl-2,2,4-trimethyl-1,2-dihydroquinoline.

Modifications may be made in the procedure. Different solvents may be used, as is indicated above. The ratio of the reactants may be varied, in accordance with the broad disclosure of the invention.

An advantageous cure is effected by using an amount of free sulfur less than that required for the vulcanization of a rubber by sulfur alone, and using a polysulfide of this invention. For instance, one may use 1 to 10 parts, preferably 2 to 3 parts, of the polysulfide and about one part of free sulfur. Other known curing agent can be substituted for sulfur in this manner. In the absence of free sulfur or other curing agent 2 to 20 parts of the polysulfide of the invention are used, although preferably over 5 parts, i.e. between 5 and 10 parts of the polysulfide will be employed. "Parts" as here used refers to parts by weight per 100 parts of the rubber polymer.

The reaction product of Example II was tested as a curing agent of a standard commercial butadiene-styrene synthetic rubber. To this end a masterbatch without curing ingredients was mixed in the usual manner in accordance with the following formula:

*Masterbatch No. 1*

| | Parts by weight |
|---|---|
| SBR | 100 |
| HAF black | 50 |
| Stearic acid | 3 |
| Asphaltic softener | 5 |
| Zinc oxide | 3 |
| Total | 161 |

Vulcanizable rubber stocks were prepared in accordance with the formulas of Table I by adding curing ingredients, including a conventional accelerator on the mill to portions of Masterbatch No. 1. In this case some free sulfur was also added to the stock containing the novel curing agent, although it could have been reacted into the curing agent instead. Each sample was cured at 280° F. for different periods of time, as indicated. The physical properties of the vulcanizates both before and after aging for 4 days at 212° F. in an air oven are given in the table. Aged cut-growth data are also recorded, obtained by the method described in the article entitled "Tread Cracking of Natural and Synthetic Rubber Stocks" by Irven B. Prettyman, Industrial and Engineering Chemistry, volume 36, pages 29–33 (January 1944) upon test blocks cured for 60 minutes at 280° F. and then aged 5 hours at 260° F. in air; the aged block is slit and the rate of growth of the slit or cut, in 0.01 inch per hour, is measured during the test. Modulus and tensile figures are given as pounds per square inch (p.s.i.).

TABLE I

| Formula (parts by weight) | Stock No. 1 | Stock No. 2 |
|---|---|---|
| Masterbatch No. 1 | 161 | 161 |
| Sulfur | 2.0 | 1.0 |
| Reaction Product of Example II | 0.0 | 2.5 |
| Accelerator | 1.2 | 1.2 |
| Total | 164.2 | 165.7 |
| NORMAL PROPERTIES | | |
| 300% Modulus (p.s.i.): | | |
| 45 min | 575 | 975 |
| 60 min | 1,475 | 1,450 |
| 90 min | 2,150 | 1,725 |
| Tensile at Break (p.s.i.): | | |
| 45 min | 1,925 | 2,775 |
| 60 min | 3,500 | 3,375 |
| 90 min | 3,400 | 3,750 |
| Elongation at Break (percent): | | |
| 45 min | 740 | 690 |
| 60 min | 580 | 600 |
| 90 min | 430 | 560 |
| AGED PROPERTIES (4 days at 212° F.) | | |
| 300% Modulus (p.s.i.): | | |
| 45 min | | |
| 60 min | | |
| 90 min | | |
| Tensile at Break (p.s.i.): | | |
| 45 min | 2,850 | 3,200 |
| 60 min | 3,050 | 3,100 |
| 90 min | 3,025 | 3,400 |
| Elongation at Break (percent): | | |
| 45 min | 220 | 260 |
| 60 min | 210 | 260 |
| 90 min | 210 | 280 |
| Aged Cut Growth—Aged 5 hours in air bomb at 260° F. (0.01 inch per hour) | 475 | 202 |

The results reported in the foregoing table show that the reaction product of Example II inhibited aging in the oven test and the rubber showed improved aged-cutgrowth properties.

The following test employed a natural rubber stock. The masterbatch formula follows:

*Masterbatch No. 2*

|  | Parts by weight |
|---|---|
| Hevea rubber | 100 |
| HAF black | 50 |
| Pine tar | 4.0 |
| Stearic acid | 3.0 |
| Zinc oxide | 3.0 |
| Total | 160.0 |

The masterbatch was compounded as indicated in the following table and the stocks were each cured at 280° F. for 45, 60 and 90 minutes, as indicated in the table. The control contained a 6-substituted 2,2,4-trimethyl-1,2-dihydroquinoline as an antioxidant, for comparison. The physical properties of the samples both before and after aging 2 days at 212° F. in an air oven are recorded in Table II.

TABLE II

| Formula (parts by weight) | Stock No. 3 | Stock No. 4 |
|---|---|---|
| Masterbatch No. 2 | 160 | 160 |
| Sulfur | 2.0 | 1.0 |
| Reaction Product of Example II | 0.0 | 2.5 |
| Antioxidant | 2.0 | 0.0 |
| Accelerator | 0.5 | 0.5 |
| Total | 164.5 | 164.0 |

NORMAL PROPERTIES

| 300% Modulus: | | |
|---|---|---|
| 45 min | 1,975 | 1,650 |
| 60 min | 2,000 | 1,700 |
| 90 min | 1,950 | 1,675 |
| Tensile at Break: | | |
| 45 min | 4,225 | 3,850 |
| 60 min | 4,100 | 3,975 |
| 90 min | 4,150 | 3,800 |
| Elongation at Break: | | |
| 45 min | 540 | 550 |
| 60 min | 530 | 560 |
| 90 min | 520 | 550 |

AGED PROPERTIES

| 300% Modulus: | | |
|---|---|---|
| 45 min | 2,275 | 1,975 |
| 60 min | 2,300 | 1,825 |
| 90 min | 2,325 | 1,750 |
| Tensile at Break: | | |
| 45 min | 2,800 | 2,900 |
| 60 min | 2,725 | 2,575 |
| 90 min | 2,750 | 2,375 |
| Elongation at Break: | | |
| 45 min | 370 | 460 |
| 60 min | 360 | 420 |
| 90 min | 360 | 410 |

Table III refers to a test of the 6-ethoxy derivative of Example I in SBR. It records the physical properties of the vulcanizate, both before and after aging in an air oven for 4 days at 212° F. The results are given to show the protection afforded by the polysulfide, both with and without free sulfur. The stocks were each cured at 280° F. for different lengths of time, and the properties for each different cure are recorded. The results compare a rubber cured with free sulfur alone, with rubbers cured with a polysulfide, both with and without added sulfur. Somewhat more polysulfide, for example up to 7 parts might have been used to advantage in the cure of Stock No. 7. Therefore, in comparing the properties of Stock No. 7 with the other stocks, the values obtained with a 90 minute cure may be compared with the properties of the 60 minute cure of Stock No. 5 and the 45 minute cure of Stock No. 6.

TABLE III

| Formula (parts by weight) | Stock No. 5 | Stock No. 6 | Stock No. 7 |
|---|---|---|---|
| Masterbatch No. 1 | 161 | 161 | 161 |
| Sulfur | 2.0 | 1.0 |  |
| Reaction Product of Example II |  | 2.5 | 5.0 |
| Accelerator | 1.2 | 1.2 | 1.2 |
| Total | 164.2 | 165.7 | 167.2 |

NORMAL PROPERTIES

| 300% Modulus: | | | |
|---|---|---|---|
| 45 min | 1,050 | 1,800 | 1,125 |
| 60 min | 1,800 | 2,000 | 1,300 |
| 90 min | 2,375 | 2,250 | 1,500 |
| Tensile at Break: | | | |
| 45 min | 3,025 | 3,700 | 3,100 |
| 60 min | 3,600 | 3,775 | 3,250 |
| 90 min | 3,275 | 3,700 | 3,575 |
| Elongation at Break: | | | |
| 45 min | 690 | 550 | 690 |
| 60 min | 540 | 510 | 640 |
| 90 min | 420 | 460 | 610 |

AGED PROPERTIES

| 300% Modulus: | | | |
|---|---|---|---|
| 45 min |  |  | 3,100 |
| 60 min |  |  | 2,875 |
| 90 min |  |  | 2,600 |
| Tensile at Break: | | | |
| 45 min | 3,075 | 3,300 | 3,575 |
| 60 min | 2,850 | 3,325 | 3,625 |
| 90 min | 2,475 | 3,075 | 3,600 |
| Elongation at Break: | | | |
| 45 min | 250 | 250 | 350 |
| 60 min | 210 | 250 | 370 |
| 90 min | 180 | 250 | 400 |

The foregoing results are indicative. Other rubbers can be used with other rubber formulae, and different curing agents may be employed, as described herein. Free sulfur can be present at the start of the cure, or all of the sulfur can be present in the polysulfide.

The polysulfides are prepared at any suitable temperature, i.e., from 0° to 150° C., under pressure if desired. Any suitable neutralizing agent may be used to neutralize the HCl as it is formed, as is indicated above; other specific examples include sodium carbonate, KOH, $NH_4OH$. The polysulfides are operable as vulcanizing agents per se, and as supplemental curing agents for use in the curing of diene rubbers. The usual curing temperatures employed by the art may be employed when using the polysulfides. For best results, curing temperatures of from about 230° to about 400° F. and preferably from about 250° to about 350° F. will be employed. The amount of the polysulfide employed will depend upon the particular composition being vulcanized and the polysulfide employed. In general, the polysulfide will be used in sufficient amount to provide a sulfur content of 0.1% to 5% based on the weight of the rubber being vulcanized.

By curing or vulcanization is meant cross-linking of rubber which makes the rubber less soluble, less thermoplastic and more elastic. Rubber can be cross-linked by heating it with sulfur or a sulfur-bearing curing agent, preferably in the presence of a suitable accelerator, and this process is well known in the rubber art as sulfur vulcanization. Other curing agents, such as selenium or tellurium, can be used in conjunction with or replacing sulfur. A different type of vulcanization or cross-linking is effected by non-elemental sulfur curing agents, of which several are known in the art, and this invention comprehends the use of such curing agents.

Modifications of the invention will be apparent to those skilled in the art. The invention is covered by the appended claims.

What I claim is:
1. A compound of the formula

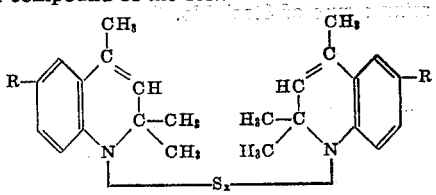

where $x$ is 2 to 4 and R is selected from the class consisting of alkyl groups of 1 to 20 carbon atoms, cycloalkyl groups of 5 to 8 carbon atoms, aryl and hydrocarbon-substituted aryl groups of 6 to 20 carbon atoms, alkoxy groups of 1 to 20 carbon atoms, aryloxy groups and alkyl-substituted aryloxy groups of 6 to 20 carbon atoms, dialkylamino groups of 2 to 10 carbon atoms, arylamino groups of 6 to 12 carbon atoms and aralkyl groups with 1 to 3 carbon atoms in the alkyl substituent.

2. The compound of claim 1 in which there is an average of more than 2 sulfur atoms in the polysulfide bridges.

3. The compound of claim 1 in which R of each dihydroquinoline nucleus is phenyl.

4. The compound of claim 1 in which R of each dihydroquinoline nucleus is ethoxy.

5. The process of curing a diene rubber which comprises heating the rubber in admixture with a compound of claim 1 which has a sulfur content of at least 15 percent.

6. The process of curing a diene rubber which comprises heating the rubber in admixture with a compound of claim 1 which has a sulfur content of at least 15 percent and added sulfur.

7. The process of curing a diene rubber which comprises heating the rubber in admixture with a compound of claim 1 which has a sulfur content of at least 15 percent, without added curing agent.

8. A diene rubber vulcanized in admixture with a compound of claim 1.

9. A diene rubber vulcanized in admixture with a compound of claim 1 with a sulfur content of at least 15 percent, and added sulfur.

10. A diene rubber vulcanized in admixture with a compound of claim 1 with a sulfur content of at least 15 percent, without added sulfur.

11. The method of producing a polysulfide reaction product which comprises reacting $S_xCl_2$, in solution and in the presence of neutralizer for hydrogen chloride produced in the reaction, with a compound of the class consisting of 2,2,4-trimethyl-1,2-dihydroquinoline and 6-substituted 2,2,4-trimethyl-1,2-dihydroquinolines, where $x$ is 2 to 4 and the 6-substituent is selected from the class consisting of alkyl groups of 1 to 20 carbon atoms, cycloalkyl groups of 5 to 8 carbon atoms, aryl and hydrocarbon-substituted aryl groups of 6 to 20 carbon atoms, alkoxy groups of 1 to 20 carbon atoms, aryloxy groups and alkyl-substituted aryloxy groups of 6 to 20 carbon atoms, dialkylamino groups of 2 to 10 carbon atoms, arylamino groups of 6 to 12 carbon atoms and aralkyl groups with 1 to 3 carbon atoms in the alkyl substituent.

12. The process of claim 11 in which $x$ is greater than 2 and no more than 4.

13. The process of claim 11 in which the substituent is phenyl.

14. The process of claim 11 in which the substituent is ethoxy.

References Cited in the file of this patent
UNITED STATES PATENTS

| | | |
|---|---|---|
| 1,084,335 | Hoffmann et al. | Jan. 13, 1914 |
| 2,794,020 | Harris et al. | May 28, 1957 |

UNITED STATES PATENT OFFICE
CERTIFICATE OF CORRECTION

Patent No. 2,988,540　　　　　　　　　　June 13, 1961

Richard W. Kibler

It is hereby certified that error appears in the above numbered patent requiring correction and that the said Letters Patent should read as corrected below.

Column 1, line 44, for "SRB" read -- SBR --; column 2, line 17, for "xylamino" read -- xylylamino --; line 33, for "monosulfide" read -- monochloride --; column 3, line 24, for "2,2,4-trimethyl-1,2-dihydro-6-ethoxy-dihydro-" read -- 6-Ethoxy-2,2,4-trimethyl-1,2-dihydro- --.

Signed and sealed this 21st day of April 1964.

(SEAL)
Attest:
ERNEST W. SWIDER

Attesting Officer

EDWARD J. BRENNER

Commissioner of Patents